United States Patent
Chien et al.

(10) Patent No.: US 7,068,693 B2
(45) Date of Patent: Jun. 27, 2006

(54) LASER DRIVER CIRCUIT FOR BURST MODE TRANSMISSION

(75) Inventors: Pi-Yao Chien, Taichung (TW); Yi-Yang Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 200 days.

(21) Appl. No.: 10/862,281

(22) Filed: Jun. 7, 2004

(65) Prior Publication Data

US 2005/0074042 A1    Apr. 7, 2005

(30) Foreign Application Priority Data

Oct. 2, 2003   (TW) ............................... 92127345 A

(51) Int. Cl.
*H01S 3/00*   (2006.01)
(52) U.S. Cl. ................ 372/38.02; 372/38.1; 372/38.03
(58) Field of Classification Search ............... 372/38.1, 372/38.02, 38.03, 38.07
See application file for complete search history.

(56) References Cited

U.S. PATENT DOCUMENTS

| | | | | |
|---|---|---|---|---|
| 5,802,089 A | * | 9/1998 | Link | 372/38.02 |
| 5,828,476 A | * | 10/1998 | Bonebright et al. | 398/136 |
| 6,108,114 A | * | 8/2000 | Gilliland et al. | 398/195 |
| 6,111,367 A | * | 8/2000 | Asano et al. | 315/291 |
| 6,282,216 B1 | * | 8/2001 | Ikeuchi et al. | 372/29.015 |
| 6,697,400 B1 | * | 2/2004 | Nomura | 372/38.02 |
| 6,738,401 B1 | * | 5/2004 | Bowler et al. | 372/38.02 |
| 2002/0075919 A1 | * | 6/2002 | Tochio | 372/38.02 |
| 2003/0174744 A1 | * | 9/2003 | Reilly | 372/32 |

\* cited by examiner

*Primary Examiner*—James Menefee
*Assistant Examiner*—Phillip Nguyen
(74) *Attorney, Agent, or Firm*—Thomas, Kayden, Horstemeyer & Risley

(57) ABSTRACT

A laser driver circuit for burst mode transmission is equipped in a transmitter at a client side within a P2MP (Point to Multipoint) optical network. The laser driver circuit utilizes a laser driver chip for a continuous mode. The selected laser driver chip is capable of working under an open-loop situation. A burst signal containing time slot information is fed to the switch connected to the laser driver chip. If the burst signal is enabled, a resistor of a predetermined value is connected to the laser driver chip via the switch so that normal driving current is generated for data transmission. If the burst signal is disabled, another resistor whose value is greater than the predetermined value is connected to the laser driver chip via the switch so that no or almost no driving current is generated, thereby avoid the signal collision problem of the channel shared by multiple clients.

14 Claims, 4 Drawing Sheets

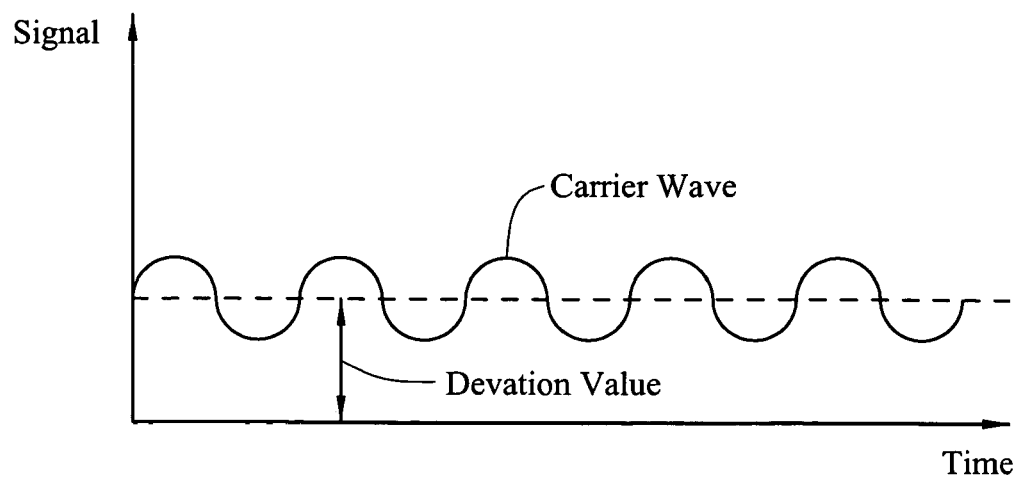
Fig. 4 ( a )
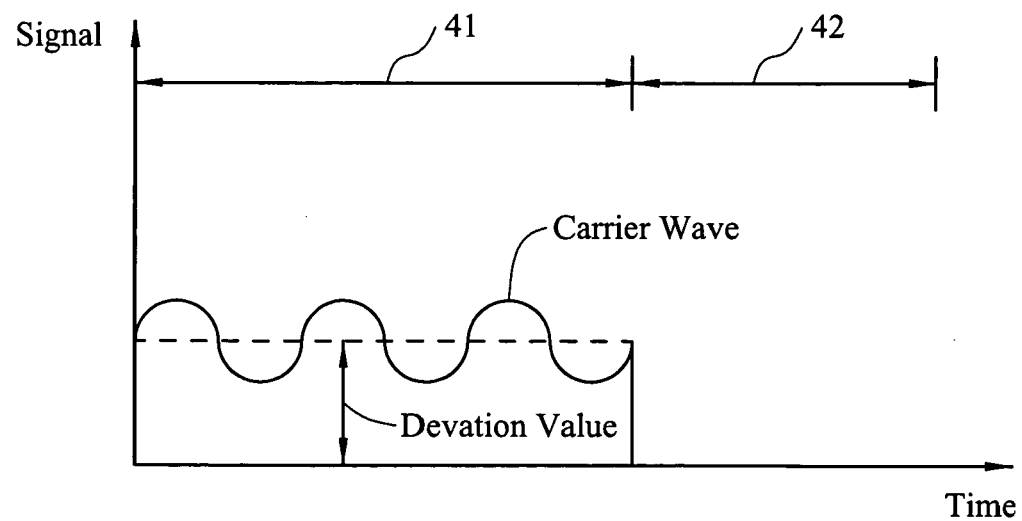
Fig. 4 ( b )

LASER DRIVER CIRCUIT FOR BURST MODE TRANSMISSION

FIELD OF THE INVENTION

The present invention relates to a laser driver circuit, and more particularly, to the laser driver circuit for burst mode transmission.

BACKGROUND OF THE INVENTION

With the continuous progress of the network technology, the demands of communication bandwidth also increase continuously. Meanwhile, various transmission media are also developed subsequently, such as microwave communication, satellite communication, etc. Among those transmission media, fiber optic communication plays an increasingly important role.

In the past, signals in the fiber optic communication are generally transmitted in a continuous mode. The so-called continuous mode means that the design of fiber optic signal avoids using too many identical bits, thereby preventing a phase-latch loop from losing the signal-latching function. In other words, since no interruption occurs in the process of signal transmission, the structure of the fiber optic communication can merely be set up as one receiver to one sender, which is also called as a P2P (Point to Point) structure.

As to the optical fiber used as the communication backbone, since the quantity of data transmission is quite huge, such as 2.5 Gbit/sec, 10 Gbit/sec or more, these is no big problem to apply the P2P structure therein. However, for applying FTTX (Fiber To The X, wherein X stands for residence, buildings, etc.) to the aforementioned fiber optic communication, since the signal demands are not continuous with interruption, the P2P structure will result in a lot of waste of bandwidth for daily applications.

To tackle with the aforementioned problem, some fiber optic communication developers present a FSAN (Full Service Access Network) structure for use in FTTX applications. In FSAN, there is an important concept called P2 MP (Point To Many Points, i.e. one point to multiple points). Speaking plainly, in P2 MP, a center office is used to transmit information to a plurality of clients, and those clients also can transmit information to the center office. A TDM (Time Division Multiplexer) can be used in the paths between the clients and the center office, and the so-called TDM means assigning a time slot to each of clients. Once the clients have information to be transmitted, the clients can transmit the information immediately, and can shut down the laser beam immediately after the information has been transmitted, thereby avoid signal collisions. The aforementioned transmission method is also called a burst mode, which is different from the aforementioned continuous mode.

As to the burst-mode fiber optic communication, its main duty resides in a laser driven integrated chip. Since input communication signals appear very shortly in the burst-mode transmission, the laser driven integrated chip has to rely on the short communication signals to drive a communication laser diode, and shut off the laser power completely when no communication signal is inputted.

Under the FSAN standard, there is no clear definition with respect to the present and stop time, so that system integrators adopt various design methods, and some of them need to use very strict time controls, therefore making the laser driven integrated chip more difficult to be assembled, thus increasing the fabrication cost.

Presently, most of the laser driven integrated chips suitable for continuous mode existing in the market, but very few of them are particularly design for the burst mode application. For this reason, the laser driven integrated chips of particularly design for the burst mode application are very expensive. If some special chips are redesigned and redeveloped for the burst mode, not only the existing design results are totally wasted, but also the expansion of the optical communication field is blocked. Hence, how to search for a cost-effective design method of a laser driven integrated chip has become a very important issue.

SUMMARY OF THE INVENTION

The object of the present invention is to provide a laser driver circuit for not only effectively lowering the fabrication cost thereof, but also benefiting the design flexibility of a fiber optic communication system.

An embodiment of the present invention is a laser driver circuit for burst mode transmission. The laser driver circuit for burst mode transmission is disposed in a data-output device located at a client side of the aforementioned FTTX structure. A center office connected to clients via the FTTP structure assigns predetermined time slots to the clients for uploading data. The time slots use the burst mode transmission to control the client data-output devices. The laser driver circuit is used to receive a burst signal, and when the burst signal is enabled, the circuit generates driving current to drive a communication laser to emit an optical signal; and when the burst signal is disabled, the circuit almost does not generate the driving current, thereby avoiding the signal collision problem resulted from the signals transmitted simultaneously by multiple clients.

The laser driver circuit has a laser driver chip, a switch, a first resistor, a second resistor and a third resistor. The laser driver chip is commonly used in a continuous-mode chip, and can be used under open-loop situation, i.e. it can maintain a certain level of stable operation without feedback. The laser driver chip has a bias-setting terminal, a modulation-setting terminal, a data-input terminal and a data-output terminal. The bias-setting terminal is connected to a resistor-output terminal of the switch. The switch receives a bust signal, and when the burst signal is enabled, the switch connects a resistor of which the resistance is more than a first predetermined value to the bias-setting terminal of the laser driver chip, thereby generating driving current for completing the generation of communication signal. In other words, the present invention articulately utilizes a circuit design to accomplish a burst-mode laser-driving job by combining the laser driving chip originally used in a continuous mode only with the related circuit elements.

Hence, the present invention at least has the following advantages. At first, no special design demand for burst-mode exclusive chip has to be made while the present invention is applied, and further the present invention shows significant efficacy since the cost for testing and designing the chip of burst mode application is quite expensive. Further, the circuit disclosed by the present invention has more flexibility, and can satisfy various demands and transmission specifications of burst mode.

The detailed description of the present invention will be stated in the below in details in accompany with the figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4(a) illustrates an operation state of a laser driver circuit;

FIG. 4(b) illustrates another operation state of the laser driver circuit;

DETAILED DESCRIPTION OF THE PREFERRED EMBODIMENT

Figure 1:
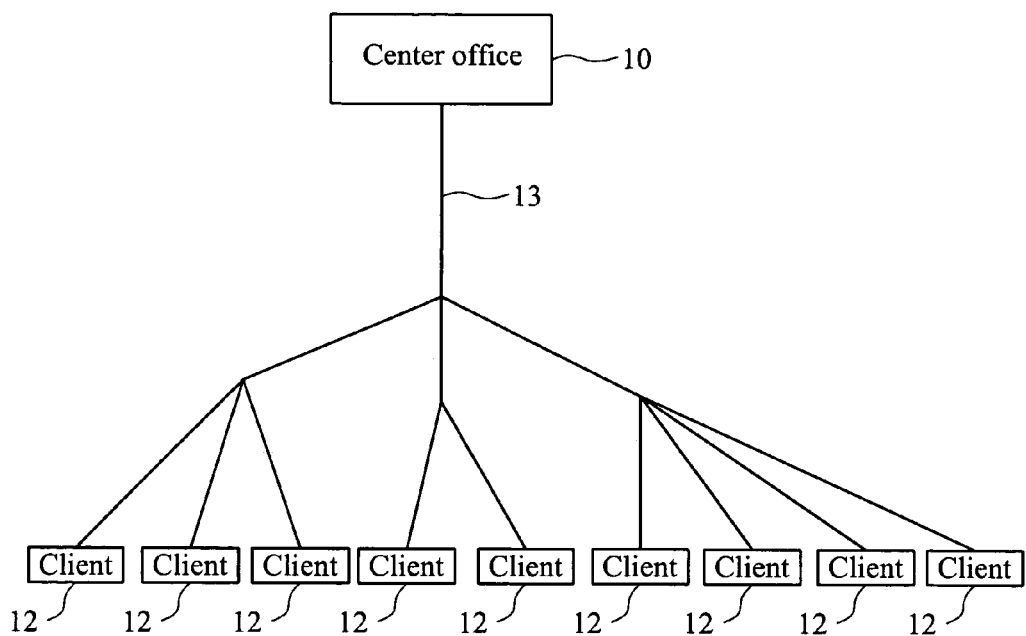
FIG. 1 illustrates a P2 MP optical communication structure.

Referring to FIG. 1, FIG. 1 is a schematic diagram showing a communication network formed through optical fiber media. A center office 10 is connected to a plurality of clients 12 via a branched optical fiber 13 so as to form a FTTX structure. The center office 10 at least uses an exclusive frequency band belonging to the branched optical fiber 13 to broadcast data and control signals to the clients 12. Besides, the plurality of clients 12 share with a common frequency band for uploading data to the center office 10. In order to avoid signal collisions resulted from the common frequency band shared by the clients 12, the communication structure adopts a TDM protocol, i.e. the center office 10 distributes time slots to the clients via an exclusive channel, and each of the clients 12 is only allowed to upload data in its assigned time slot, thereby preventing signal interference.

The center office 10 can be such as an ISP (Internet Service Provider), a telecommunication carrier or various communication intermediators. Hence, a central-office-side device (not shown) is disposed at the center office 10 for processing the aforementioned data and controlling signal broadcasts, and receives the data transmitted from the clients 12, and further transmits the data to alternative clients 12 or transfers the data to other networks such as Internet, etc.

Figure 2:
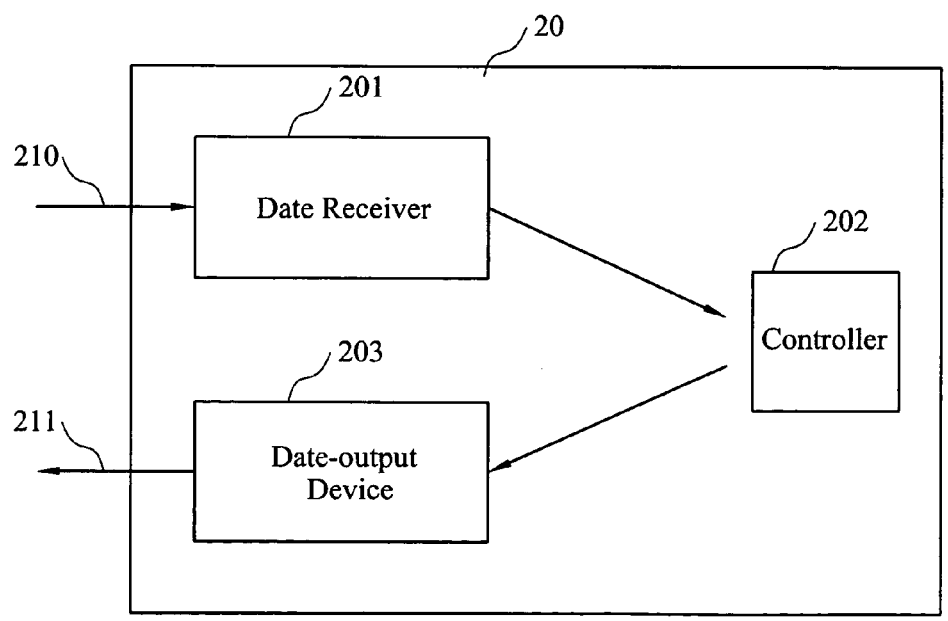
FIG. 2 illustrates an optical communication device of the present invention.

Thereafter, referring FIG. 1 and FIG. 2, an optical communication device 20 disposed at each of the client 12 will be explained hereinafter. The optical communication device 20 is connected to the central-office-side device of the center office 10 via the optical fiber 13, and the optical communication device 20 has a data receiver 201, a data-output device 203 and a controller 202. The data receiver 201 receives data from a receiving channel 210 of the optical fiber 13, and the input data include time-slot data assigned to the respective clients from the center office 10, wherein the time-slot data specify the time period in which the optical communication device 20 is allowed to upload data to the center office 10.

Further, the controller 202 is connected to the data receiver 201 for receiving the time-slot data, and the controller 202 is enabled to form a burst mode in one time period, and is disabled in the other time period.

The controller 202 further controls the data-output device 203 via burst signals, so that the data-output device 203 uploads data to the center office 10 through the optical fiber 13 via an output channel 211 only in the burst mode.

Figure 3:
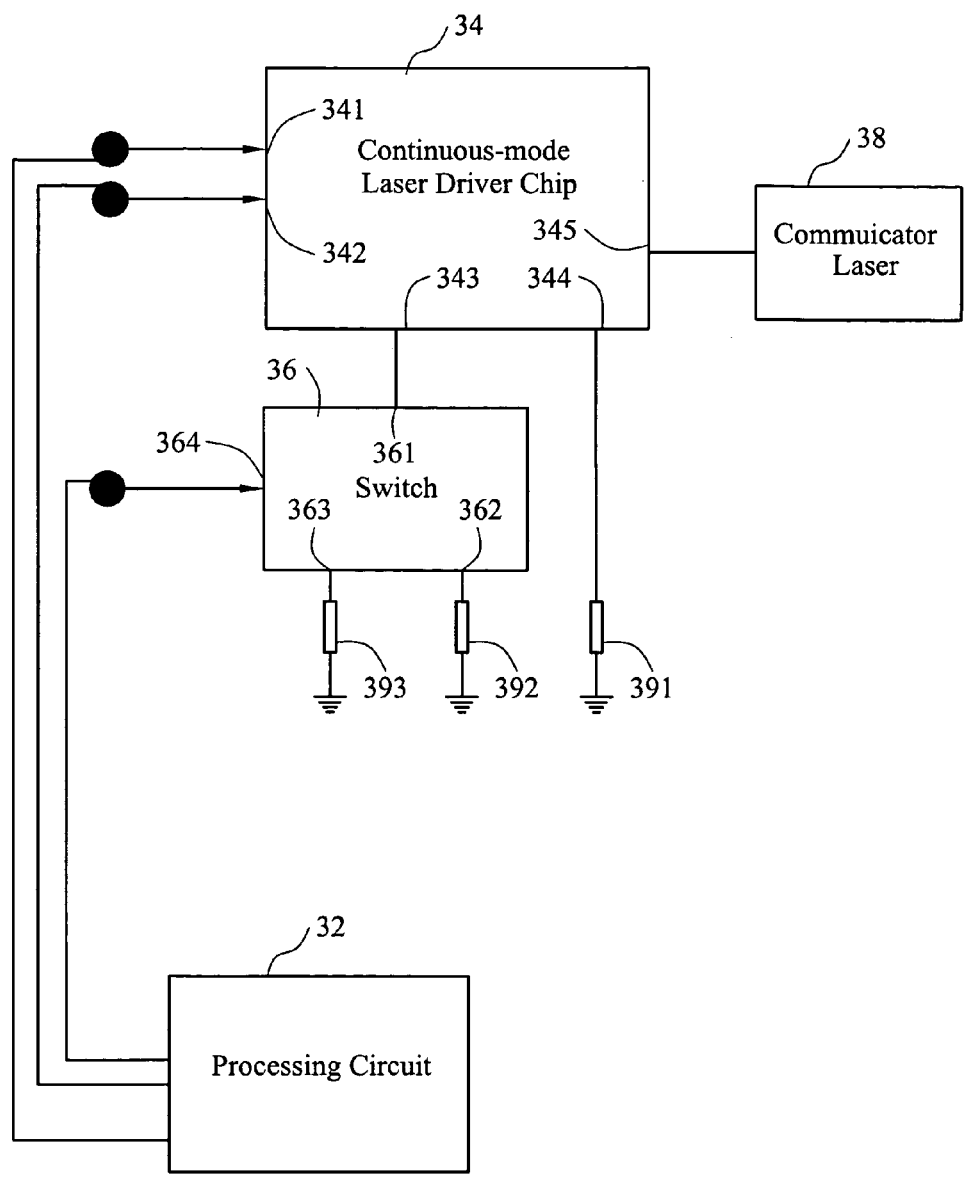
FIG. 3 a schematic design diagram showing a laser driver circuit of the present invention.

Thereafter, referring to FIG. 3, FIG. 3 is a schematic diagram showing partial elements of the data-output device 203. The data-output device 203 has a processing circuit 32, a laser driver circuit 34, a switch 36 and a communication laser 38 used as a transmitter.

Otherwise, the laser driver chip 34 is a continuous-mode driving element used in a P2P continuous-mode driven communication laser 38 to generate fiber optic communication signals, such as MAX3850 laser driver chip, which is available in the market.

Further, the laser driver chip 34 used herein must be able to maintain a certain level of stable operation without feedback (i.e. under an open-loop situation), and the laser driver chip 34 at least has a bias-setting terminal 343, a modulation-setting terminal 344, a data-input terminal 341 and a data-output terminal 345.

In the conventional application, the qualified laser driver chip 34 is to connect the modulation-setting terminal 344 with a variable resistor 391, thereby modulating the signal amplitude outputted from the communication laser 38. When the communication laser 38 obtains an output signal of proper amplitude, then the resistance value of the variable resistor 391 is fixed, such as shown in FIG. 4(a), wherein the variable resistor 391 is modulated to a predetermined value so as to make the output signal from the communication laser 38 have a proper amplitude. As to the conventional application, the bias-setting terminal 343 of the laser driver chip 34 is used for protecting the laser driver chip 34, thereby preventing the laser driver chip from being damaged by overpower.

However, in the present invention, the laser driver chip 34 originally used in the continuous mode can drive a circuit via the burst mode in accordance with the present invention, and thus, the continuous-mode laser driver chip is applicable to the burst mode.

In FIG. 3, the data-output terminal 345 of the laser driver chip 34 is connected to the communication laser 38 for emitting optical burst signals which are uploaded to the center office 10 via the optical fiber. Further, the data-input terminal 341 of the laser driver chip 34 is connected to a processing circuit 32 for receiving the data ready to be uploaded to the center office 10. A clock-input terminal 342 of the laser driver chip 34 receives a clock signal coming from the processing circuit 32. Further, the bias-setting terminal 343 of the laser driver chip 34 is connected to a resistor-output terminal 361 of a switch 36.

In addition to the resistor-output terminal 361, the switch 36 has a bias-control terminal 364 and resistor-selecting terminals 362 and 363. The bias-control terminal 364 is responsible for receiving an enabling signal and disabling signal form the aforementioned controller 202 shown in FIG. 2. The resistor-selecting terminals 363 and 362 are connected respectively to a first resistor 393 and a second resistor 392 of which the resistance values are different.

When the signal received by the bias-control terminal 364 is the enabling signal, the resistor-selecting terminal 363 and the first resistor 393 are electrically conducted, and the resistance value of the first resistor 393 is passed to the bias-setting terminal 343 of the laser driver chip 34. Meanwhile, the laser driver chip 34 abruptly supplies an operating bias to the communication laser 38, such as the left half 41 shown in FIG. 4(b).

In contrast, when the signal received by the bias-control terminal 364 is the disabling signal, the resistor-selecting terminal 362 and the second resistor 392 are electrically conducted, and the resistance value of the second resistor 392 is passed to the bias-setting terminal 343. Meanwhile, the laser driver chip 34 stops supplying the operating bias to the communication laser 38, such as the right half 42 shown in FIG. 4(b).

As to the resistance values of the first resistor 393 and the second resistor 392, they have to be set in accordance with the specification of the laser driver chip 34 used. For example, with respect to the commercial laser driver chip 34 used in the continuous mode, the commercial laser driver chip 34 usually stops outputting a driving voltage when the bias-setting terminal 343 thereof is connected with a resistance greater or smaller than a specific value. In this example, assume the laser driver chip 34 which we used stops outputting a driving voltage when the bias-setting terminal 343 is connected with a resistance greater than a specific value, then we can set the resistance value of the second resistor 392 to the one greater than the specific value, and that of the first resistor 393 is set to a certain value smaller than the specific value.

Hence, when the switch 36 electrically connects the second resistor 392 to bias-setting terminal 343 of the laser driver chip 34, the laser driver chip 34 stops supplying the operating bias, thus achieving the effect described above. Conversely, assume the laser driver chip 34 which we used stops outputting a driving voltage when the bias-setting terminal 343 is connected with a resistance smaller than a specific value, that's to say when the bias-setting terminal 343 receives a resistance smaller then the specific value, the laser driver chip 34 stops voltage output, wherein the connection to the first resistor 393 and that to the second resistor 392 must do the opposite configuration, which is not described repeatedly herein.

Further, the examples of the switch 36 include various analog switches, which are all suitable for use in the present invention as long as the terminals thereof can be switched to different circuit elements in accordance with voltage.

In other words, after appropriate circuit arrangement, the laser driver chip 34 originally used in the continuous mode is allowed to transmit signals only in the assigned time periods, and cannot emit any signal during the non-assigned periods, thereby avoiding the signal interference caused by multiple clients.

In view of the explanation described above, those who are skilled in the art can briefly complete the client optical communication device by using a commercial continuous-mode laser driver chip with the addition of the aforementioned circuit arrangement.

Figure 5:
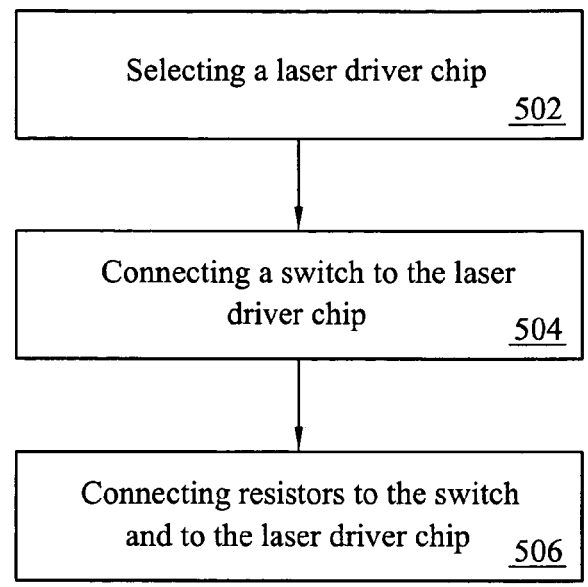
FIG. 5 is a flow chart showing the design method according to the present invention.

In summary, the present invention provides a method for fabricating a laser deriver circuit for burst mode. Referring to FIG. 5, FIG. 5 shows an embodiment for explaining the fabrication method of the present invention. At first, a laser driver chip is selected (step 501), wherein the laser driver chip is a chip used in a continuous mode, and can maintain a stable utilization under an open-loop situation. The laser driver chip has a bias-setting terminal, a modulation-setting terminal, a data-input terminal and a data-output terminal. When the resistance connected to the bias-setting terminal is a first predetermined value, the data-output terminal almost has no current generated. When the resistance connected to the bias-setting terminal is a second predetermined value, the data-output terminal has driving current generated to drive a communication laser in a burst mode, thereby completing the data transmission of optical communication.

Thereafter, a switch (such as an analog switch) is connected to the laser driver ship (step 504). The switch has a bias-control terminal, a first resistor terminal, a second resistor terminal and resistor-output terminal. The resistor-output terminal is connected the bias-setting terminal of the laser driver chip, and the first resistor terminal is connected to a resistor having the first predetermined value, and the second resistor terminal is connected to a resistor having the second predetermined value (step 506). The bias-control terminal is connected to a processing circuit, and receives an enabling/disabling signal. While receiving an enabling signal, the switch connects a resistor of the second resistor terminal to its resistor-output terminal; and while receiving a disabling signal, the switch connects a resistor of the first resistor terminal to its resistor-output terminal.

Figure 6:
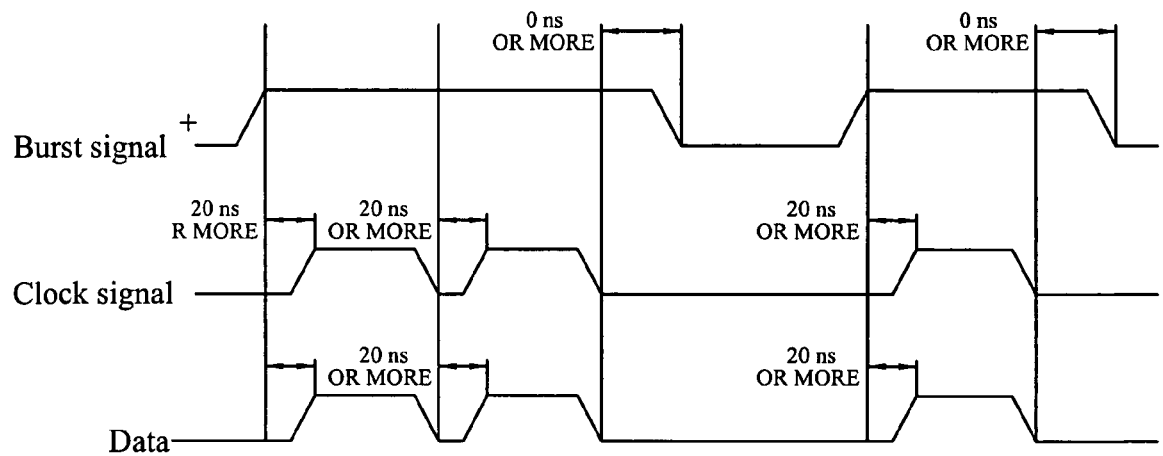
FIG. 6 is a clock diagram showing the data transmission of the laser driver circuit according to the present invention.

Further, according to the present invention, the laser driver circuit for burst mode transmission can be electrically connected to conventional signal modulating/demodulating and related control elements. FIG. 6 shows an operation clock diagram of the laser driver circuit fabricated in accordance with the aforementioned description, thereby providing explanation of actually satisfying the communication demands of burst mode, wherein the clock signal received by the laser driver chip 34 from the processing circuit 32 is used for latching with an optical burst signal.

On the other hand, according the experimental results of the aforementioned embodiment, even under an open loop situation (i.e. the mode without feedback), the continuous-mode laser driver chip has less than 3 db variation of output power within the temperature range of 0 to 70° C. Hence, the drive circuit for burst mode transmission fabricated according to the aforementioned method has already met various transmission specifications of burst mode.

Hence, the present invention at least has the following advantages. At first, no special design demand for burst-mode exclusive chip has to be made while the present invention is applied, and further the present invention shows significant efficacy since the cost for testing and designing the chip of burst mode application is quite expensive. Further, the circuit disclosed by the present invention has more flexibility since it is not a chip designed for special specifications, and the output result of the circuit also can be adjusted via resistors externally connected thereto, thus suitable for various demands and transmission specifications of burst mode.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A driver circuit for burst mode transmission, for enabling a transmitter to output a data signal abruptly at an operating bias in accordance with an enabling signal, and disabling said transmitter from working at said operating bias in accordance with a disabling signal, said driver circuit comprising:

a continuous-mode driving element, wherein said continuous-mode driving element is electrically connected to said transmitter and provides said operating bias and a substantially zero bias value to said transmitter;

a first resistor having a first resistance value;

a second resistor having a second resistance value which is different from said first resistance value of said first resistor; and a switch having a bias-control terminal, a resistor-selecting terminal and a resistor-output terminal, wherein said bias-control terminal is used for receiving said enabling signal and said disabling signal; wherein, when said bias-control terminal receives said enabling signal, said resistor-selecting terminal and said first resistor are electrically conducted, and said first resistance value is supplied to said continuous-mode driving element via said resistor-output terminal, and said continuous-mode driving element is enabled to supply said operating bias abruptly to said transmitter, and when said bias-control terminal receives said disabling signal, said resistor-selecting terminal and said second resistor are electrically conducted, and said second resistance value is supplied to said continuous-mode driving element via said resistor-output terminal, and said continuous-mode driving element is stopped supplying said operating bias to said transmitter.

2. The driver circuit for burst mode transmission according to claim 1, wherein said continuous-mode driving element is operated in an open loop.

3. The driver circuit for burst mode transmission according to claim 2, wherein said first resistance value is smaller than said second resistance value.

4. The driver circuit for burst mode transmission according to claim 1, wherein said first resistance value is smaller than said second resistance value.

5. The driver circuit for burst mode transmission according to claim 1, wherein said continuous-mode driving element has a bias-setting terminal used for setting said operating bias supplied to said transmitter from said continuous-mode driving element.

6. The driver circuit for burst mode transmission according to claim 1, wherein said enabling signal and said disabling signal are provided by a control circuit.

7. The driver circuit for burst mode transmission according to claim 1, wherein said continuous-mode driving element supplies said substantially zero bias value to said transmitter when said bias-control terminal receives said disabling signal.

8. A method for driving a transmitter with burst mode transmission, comprising:
   providing a continuous-mode driving element;
   selecting and outputting a first resistance value to said continuous-mode driving element by controlling a switch in accordance with an enabling signal;
   abruptly outputting a operating bias and a substantially zero bias value to said transmitter from said continuous-mode driving element in accordance with said first resistance value, thereby enabling said transmitter to abruptly outputting data; and
   selecting and outputting a second resistance value to said continuous-mode driving element by controlling a switch in accordance with a disabling signal, thereby stopping said continuous-mode driving element from supplying said operating bias to said transmitter, wherein said second resistance value is different from said first resistance value.

9. The method for driving said transmitter with burst mode transmission according to claim 8, wherein said first resistance value is smaller than said second resistance value.

10. The method for driving said transmitter with burst mode transmission according to claim 8, wherein said continuous-mode driving element supplies said substantially zero bias value to said transmitter when a bias-control terminal of said switch receives said disabling signal.

11. The method for driving said transmitter with burst mode transmission according to claim 8, wherein said continuous-mode driving element has a bias-setting terminal used for setting said operating bias supplied to said transmitter from said continuous-mode driving element.

12. An optical communication device installed at a client side, wherein said optical communication device is used for connecting to a central-office-side device at a center office, said optical communication device comprising:
   a data receiver receiving input data including a slot information from said central-office-side device, wherein said slot information is assigned within a predetermined period of time, thus enabling said optical communication device to output data to said central-office-side device;
   a controller generating an enabling signal within said predetermined period of time of said slot information, or else generating a disabling signal beyond said predetermined period of time of said slot information;
   said driver circuit for burst mode transmission according to claim 1, wherein said driver circuit enables said transmitter to output a data signal abruptly to said center office at an operating bias in accordance with said enabling signal, and also disabling said transmitter from working at said operating bias in accordance with said disabling signal.

13. The optical communication device according to claim 12, wherein said optical communication device supplies a substantially zero bias value to said transmitter in accordance with said disabling signal.

14. The method for driving said transmitter with burst mode transmission according to claim 8, wherein said continuous-mode driving element is operated in an open loop.

* * * * *